US006180860B1

(12) United States Patent
Chen

(10) Patent No.: US 6,180,860 B1
(45) Date of Patent: Jan. 30, 2001

(54) STRUCTURE OF A DRUM BEATER

(76) Inventor: Ming-Hwai Chen, P.O. Box 82-144, Taipei (TW)

( * ) Notice: Under 35 U.S.C. 154(b), the term of this patent shall be extended for 0 days.

(21) Appl. No.: 09/520,179

(22) Filed: Mar. 7, 2000

(51) Int. Cl.[7] .................................................... G01D 13/02
(52) U.S. Cl. ........................ 84/422.4; 84/422.1; 84/422.2
(58) Field of Search ................................ 84/422.4, 422.1, 84/411 R, 254, 404

(56) References Cited

U.S. PATENT DOCUMENTS 2,586,163 * 2/1952 Heiderich ............................... 84/422
5,998,718 * 12/1999 Liao .................................... 84/422.1
5,998,719 * 12/1999 Chuang ............................... 84/422.4

* cited by examiner

*Primary Examiner*—Robert E. Nappi
*Assistant Examiner*—Kim Lockett
(74) *Attorney, Agent, or Firm*—A & J

(57) ABSTRACT

The present invention relates to an improved structure of a drum beater, and in particular, the beating element of the drum beater can be optionally replaced. The drum beater has a body with a plurality of sides, and each of the sides is provided with an insertion slot. An engaging plate with a protruded rail at one of the surface of the plate is insertable into the insertion slot. The other surface of the plate is adhered with the beating element made of an appropriate material and/or various arch-shaped surface. The drum beater is connected by a rod pivotally connected to a drum pedal.

1 Claim, 5 Drawing Sheets

STRUCTURE OF A DRUM BEATER

BACKGROUND OF THE INVENTION a) Technical Field of the Invention

The present invention relates to an improved structure of a drum beater, and in particular, to a drum beater having a body of multiple sides, and each of the sides is provided with an insertion slot to mount with a beating element. Accordingly, the beating element of the drum beater can be easily replaced.

b) Description of the Prior Art

FIGS. 6 and 7 show the structure of a conventional drum beater having a cylindrical body 30 enclosed externally with a surface layer 34 made from a fiery material or a plastic material. A rod 31 is connected to the body 30 and the body 30 is positioned in between a top and a bottom positioning plates 32. A screw nut 33 is used to fasten the body 30 onto the rod 31. This conventional drum beater only has a fixed, single material beating surface. Accordingly, if different beating sound is required, it is difficult to change the beating surface and/or the material enclosed the body 30. ROC Patent Publication No. 367073 (Application No. 86207305) entitled "An improved structure of a drum beater" discloses the replacement of the materials enclosed the body, and these materials are directly adhered to the surface of the body 30. Thus, the mounted material is always fixed to the surface and the materials are the materials are not replaceable. In practice, a single, fixed material beating surface cannot satisfy a drummer to produce excellent sound. Therefore, the entire drum beater has to be changed or to purchase more drum beaters for use in order to produce different sound quality. However, the cost of a drum beater is expensive and it is necessary to invent a drum beater, wherein the material for the beating surface can be changed if requires.

SUMMARY OF THE INVENTION

Accordingly, it is an object of the present invention to provide an improved structure of a drum beater, wherein the body of the drum beater has a plurality of sides and each of the sides is provided with an insertion slot for mounting with a protruded rail of the beating element.

Yet another object of the present invention to provide an improved structure of a drum beater, wherein the beating element is made from various materials and has an arch-shaped surface, which facilitates the needs of an appropriate beating element for the drum beater.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
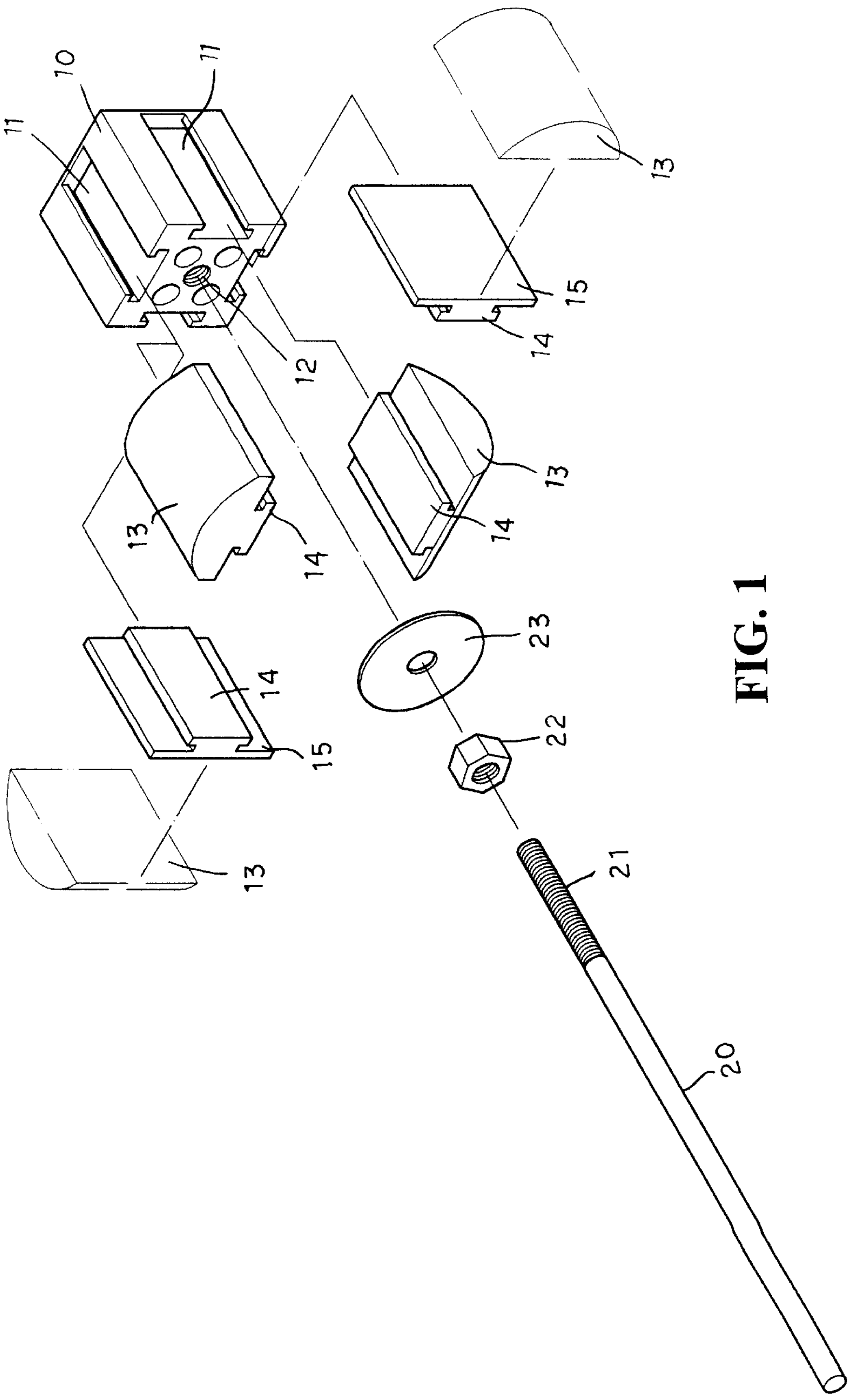
FIG. 1 is a perspective exploded view of an improved structure of a drum beater of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
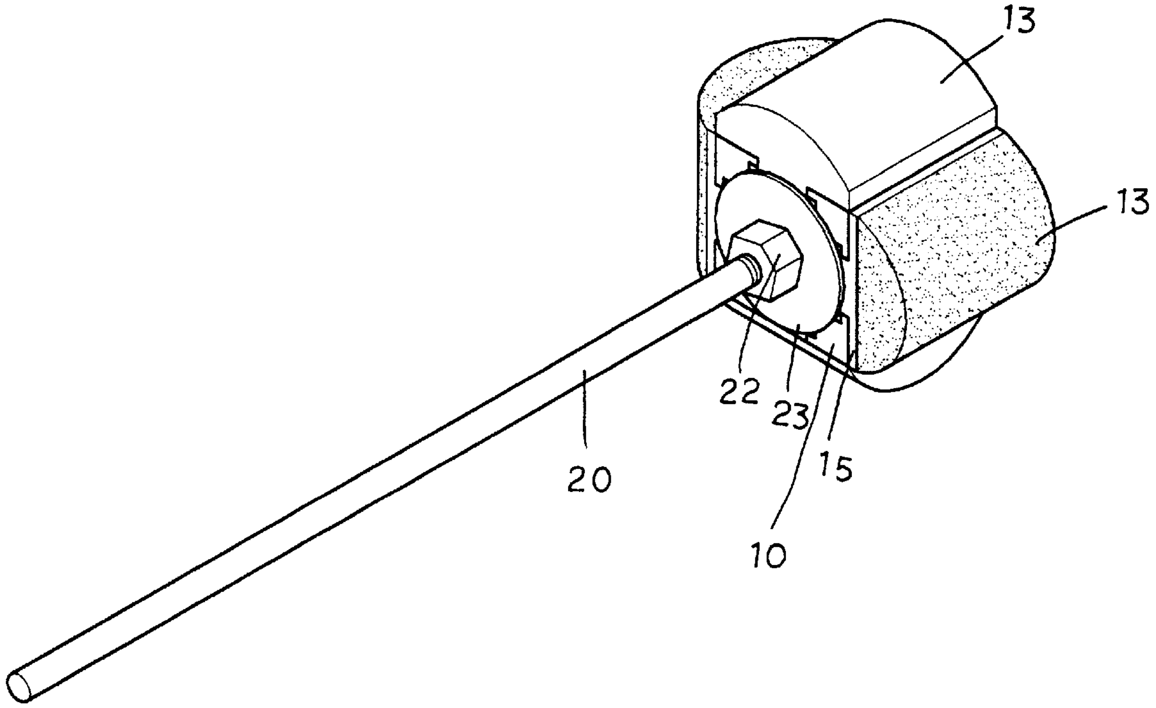
FIG. 2 is a perspective view of the drum beater of the present invention.
Figure 3:
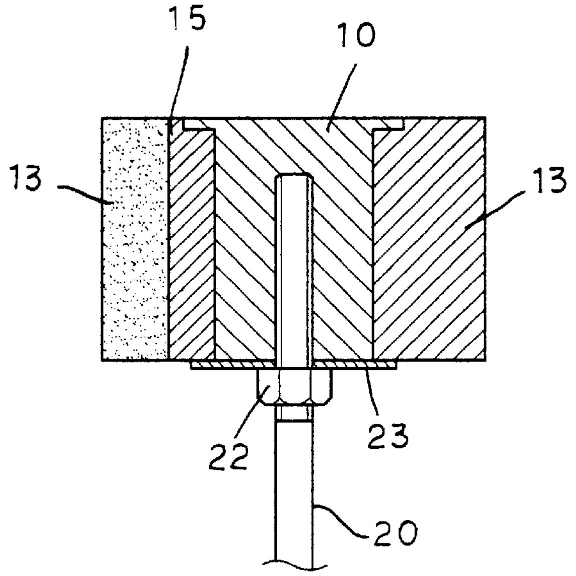
FIG. 3 is a sectional view of the drum beater of the present invention.
Figure 4:
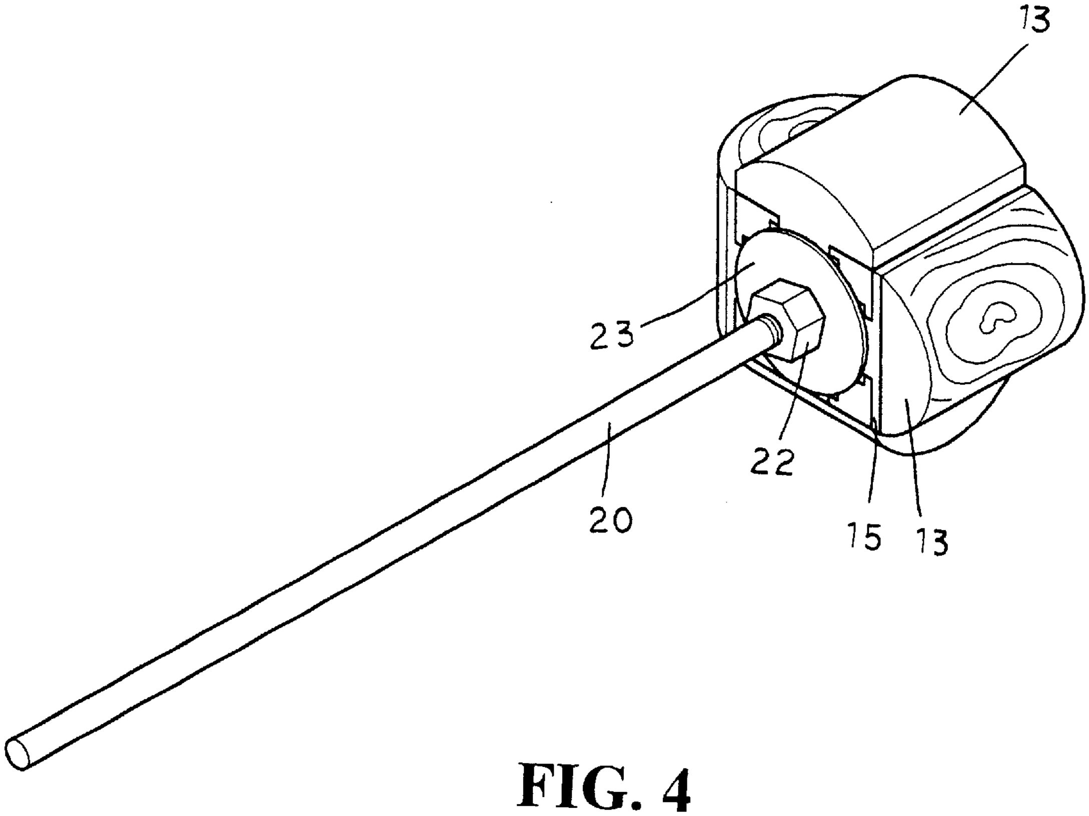
FIG. 4 is a perspective view of another preferred embodiment of the present invention.
Figure 5:
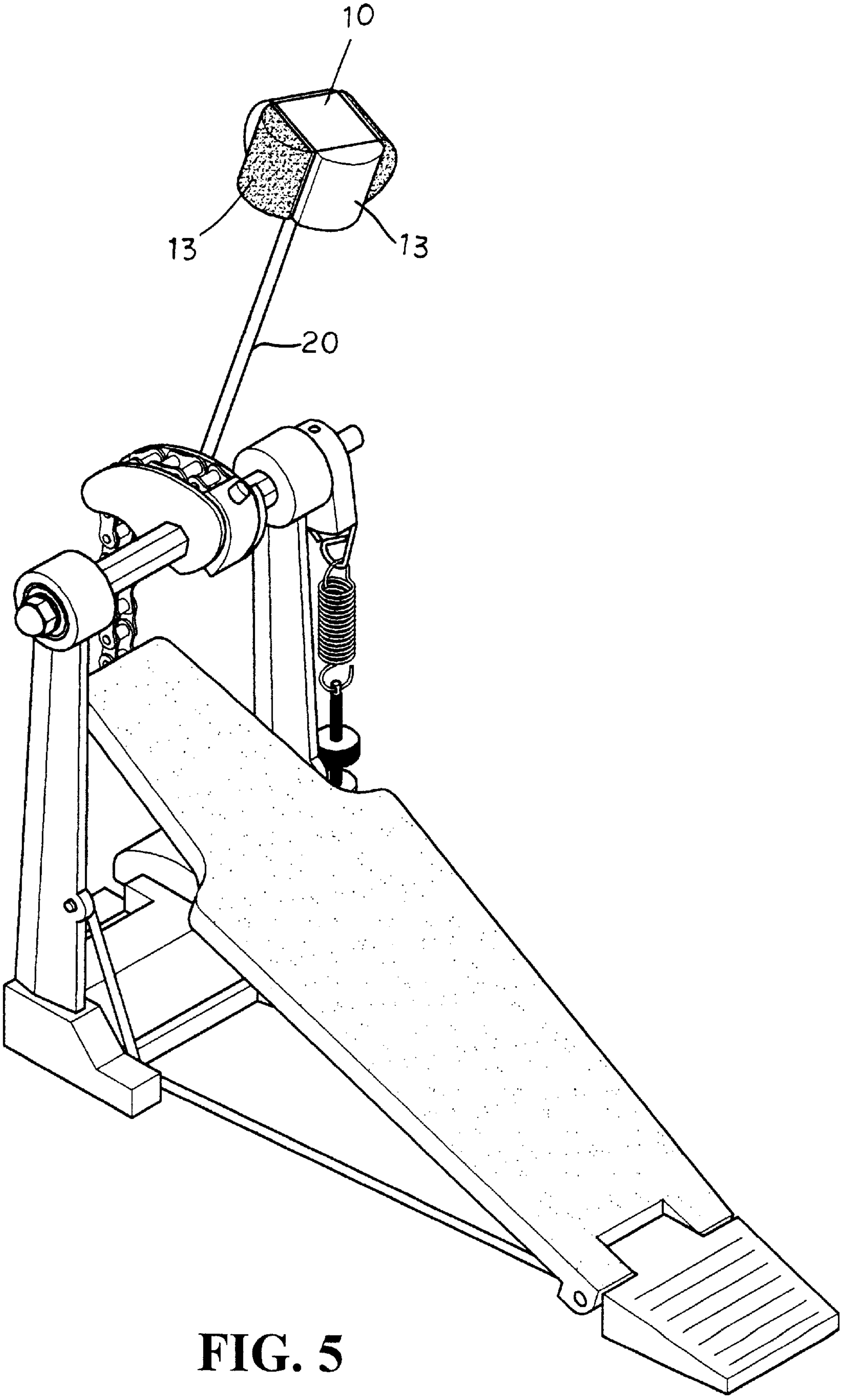
FIG. 5 is a perspective view of the drum beater module in accordance with the present invention.
Figure 7:
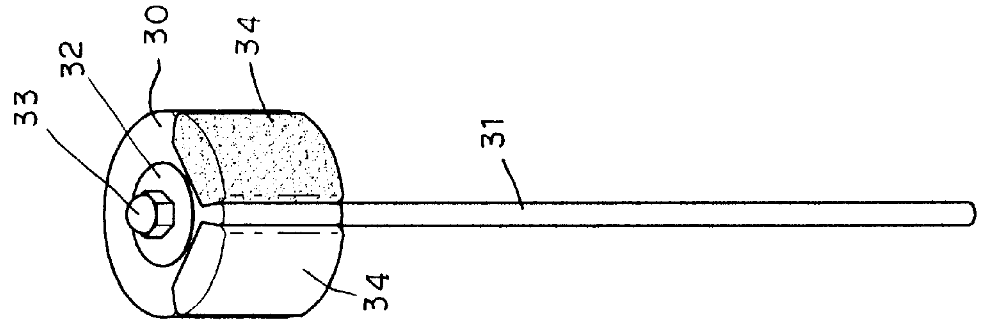
FIG. 7 is a perspective view of a conventional drum beater.
Figure 6:
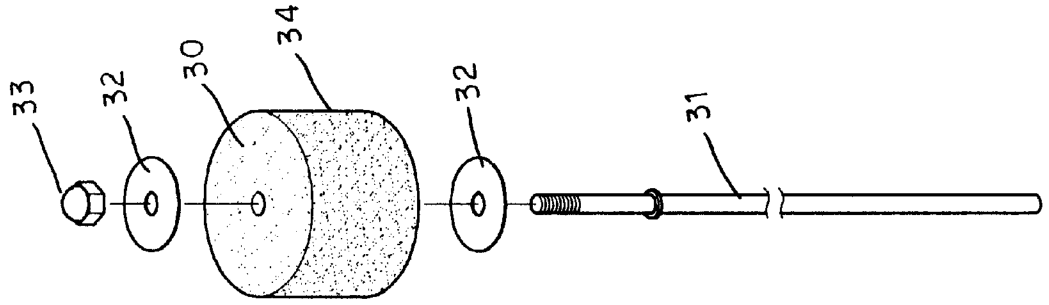
FIG. 6 is an exploded perspective view of a conventional drum beater.

Referring to FIGS. 1–3, there is shown an improved structure of a drum beater comprising a body 10 having a plurality of sides, for instance three or four sides. The number of sides greatly depends on the utilization requirements of the drummer. In accordance with the present invention, each side of the body 10 is provided with an insertion slot 11. The shape of the slot 11 is either an inverted T-shape or dovetail shape, which is used for mounting with a rail structure of similar shapes. The horizontal length of the insertion slot 11 is at least half the horizontal length of the body 10. The center of the bottom section of the body 10 is provided with a screw hole 12 for connection with a rod 20. The external sides of the body 10 are each provided with a beating element 13 which has a beating surface and a protruded rail 14. The protruded rail 14 can be inserted into the insertion slot 11 and the beating surface is an arch-shaped or an engaging plate 15 is used as a base plate, wherein the top surface of the engaging plate 15 is mounted with a furry material, a wood material or a rubber material to form the beating element 13. The bottom surface of the engaging plate 15 is a protruded rail 14 which can be inserted into the insertion slot 11 so as to form into an independent beating element 13. The sides of the body 10 can be inserted with various type of beating element 13. As shown in FIGS. 2 and 3, when different types of beating elements 13 are inserted into the insertion slot 11, the rod 20 having a threaded end is mounted at the center screw hole 12, and the rod 20 is tightened with a screw nut 22 and a positioning plate 23, such that the beating elements 13 are firmly secured. The beating elements 13 will not disengaged from the body 10 as the positioning plates 23 are used to secure these elements 13.

In accordance with the present invention, as the beating elements 13 are replaceable and the material of the beating surface can be changed with other materials, the claimed drum beater can be used to produce the required sound.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved structure of a drum beater comprising a body and a plurality of beating elements, characterized in that the body is provided with a plurality of sides and each side is provided with an insertion slot, each of the beating elements has a beating surface and a protruded rail, thereby the beating element can be mounted onto the body by inserting the protruded rail into the insertion slot, the insertion slot is a dovetail shape or an inverted T shape, horizontal depth of the insertion slot is at least half horizontal length of the body, the beating elements are each made from plastic material integrally formed as a unit, the beating elements are each formed with an engaging plate as a base plate and have various arch-shaped surfaces, a center of the body is provided with a screw hole for direct connection with a rod, the rod is tightened with a screw nut and a positioning plate before the rod is screwed to the screw hole, and the body has three or four sides.

* * * * *